United States Patent
Cho

(10) Patent No.: US 10,530,728 B2
(45) Date of Patent: Jan. 7, 2020

(54) ELECTRONIC DEVICE AND NOTIFICATION METHOD IN INTERNET SERVICE

(71) Applicant: Samsung Electronics Co., Ltd., Suwon-si, Gyeonggi-do (KR)

(72) Inventor: Ik-Hwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 14/657,292

(22) Filed: Mar. 13, 2015

(65) Prior Publication Data

US 2015/0334074 A1    Nov. 19, 2015

(30) Foreign Application Priority Data

May 16, 2014    (KR) .................. 10-2014-0058827

(51) Int. Cl.
- *H04L 12/58* (2006.01)
- *H04L 29/06* (2006.01)
- *H04L 29/08* (2006.01)

(52) U.S. Cl.
CPC ............ *H04L 51/32* (2013.01); *H04L 65/403* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | |
|---|---|---|
| 8,422,747 B1 | 4/2013 | Leung et al. |
| 2008/0288509 A1 | 11/2008 | Mysen et al. |
| 2009/0169062 A1* | 7/2009 | Cheung ................ G06Q 30/02 382/115 |
| 2009/0254529 A1* | 10/2009 | Goldentouch ........ G06F 17/241 |
| 2009/0324022 A1* | 12/2009 | Sangberg ............... G06F 16/58 382/118 |
| 2011/0119296 A1* | 5/2011 | Park .................... G06F 16/9038 707/769 |
| 2012/0114199 A1* | 5/2012 | Panyam ............. G06K 9/00288 382/118 |
| 2012/0166433 A1 | 6/2012 | Tseng |
| 2012/0317592 A1* | 12/2012 | Kim ...................... H04N 21/27 725/14 |

(Continued)

FOREIGN PATENT DOCUMENTS

EP    2 579 541 A1    4/2013

*Primary Examiner* — Clayton R Williams
*Assistant Examiner* — Christopher B Robinson
(74) *Attorney, Agent, or Firm* — Jefferson IP Law, LLP

(57) ABSTRACT

A server, an electronic device, and a notification method in an Internet service are provided. The server includes a communication unit, a social notification message generator configured to generate a social notification message, and a controller configured to compare, if recognizing first contents that are new contents from a first user, previously received contents with the first contents, to control, if second contents including at least a part of information of the first contents exist among information of the previously received contents, the social notification message generator to generate a notification message indicating that the first contents related with the second contents are uploaded, and to control the communication unit to send the generated notification message to at least one user who uploads one of the first contents and the second contents.

19 Claims, 11 Drawing Sheets

(56) References Cited

U.S. PATENT DOCUMENTS

| | | | |
|---|---|---|---|
| 2013/0073623 A1* | 3/2013 | Nguyen | H04N 21/23103 709/204 |
| 2013/0089243 A1 | 4/2013 | Sauve et al. | |
| 2013/0113814 A1* | 5/2013 | Howard | G06T 7/00 345/522 |
| 2013/0124596 A1 | 5/2013 | Damman et al. | |
| 2013/0339376 A1* | 12/2013 | Takamura | G06F 16/9535 707/755 |
| 2014/0046933 A1* | 2/2014 | Liu | H04W 4/185 707/222 |
| 2014/0067909 A1* | 3/2014 | Johansson | G06Q 30/02 709/203 |
| 2014/0129627 A1* | 5/2014 | Baldwin | H04L 67/306 709/204 |

* cited by examiner

ELECTRONIC DEVICE AND NOTIFICATION METHOD IN INTERNET SERVICE

CROSS-REFERENCE TO RELATED APPLICATION(S)

This application claims the benefit under 35 U.S.C. § 119(a) of a Korean patent application filed on May 16, 2014 in the Korean Intellectual Property Office and assigned Serial number 10-2014-0058827, the entire disclosure of which is hereby incorporated by reference.

TECHNICAL FIELD

The present disclosure relates to an electronic device and a method for notifying contents-related information in an Internet service.

BACKGROUND

A Social Network Service (SNS), one of various forms of an Internet Service, forms a social network among users on the Internet, and provides a service for sharing contents among the users. The users share their personal information, photos, interests, and the like through the SNS, and notify related users of shared contents through the SNS, such that a platform for sharing information may be formed. Once information is uploaded, an SNS server notifies users connected to an SNS account of the uploading of the information.

Recently, users have captured numerous images by using their smart phones, and in line with this, an SNS has expanded the SNS's influence as an important means for uploading such captured images.

With the diversification of SNS types, types of contents uploaded to the SNS sites have also increased. Thus, users receive notifications regarding contents uploaded by many users. Moreover, in spite of automatic reception of the notifications, only a few contents may appeal to users. Meanwhile, to receive the notifications, the users need to access an SNS application installed in an electronic device or an SNS site.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a notification method in an Internet service, in which information of a user and information of contents uploaded by another user are compared with each other to provide a notification regarding contents related to the user and a message inviting the user to react to the user-related contents is displayed.

Other objects to be provided in the present disclosure may be understood by various embodiments described below.

In accordance with an aspect of the present disclosure, a notification method of a server in an Internet service is provided. The notification method includes comparing, if recognizing first contents that are new contents from a first user, previously received contents with the first contents, generating, if second contents including at least a part of information of the first contents exist among information of the previously received contents, a notification message indicating that the first contents related with the second contents are uploaded, and sending the generated notification message to at least one user who uploads one of the first contents and the second contents.

In accordance with another aspect of the present disclosure, a notification method of an electronic device in an Internet service is provided. The notification method includes transmitting first contents to a server, receiving a notification message regarding second contents including information of the first contents from the server, and displaying the notification message.

In accordance with another aspect of the present disclosure, a server in an Internet service is provided. The server includes a communication unit, a social notification message generator configured to generate a social notification message, and a controller configured to compare, if recognizing first contents that are new contents from a first user, previously received contents with the first contents, to control, if second contents including at least a part of information of the first contents exist among information of the previously received contents, the social notification message generator to generate a notification message indicating that the first contents related with the second contents are uploaded, and to control the communication unit to send the generated notification message to at least one user who uploads one of the first contents and the second contents.

In accordance with another aspect of the present disclosure, an electronic device of an Internet service is provided. The electronic device includes a communication module, a display, and a processor to control the communication module to transmit first contents to a server and receive a notification message regarding second contents including information of the first contents from the server, and to control the display to display the notification message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
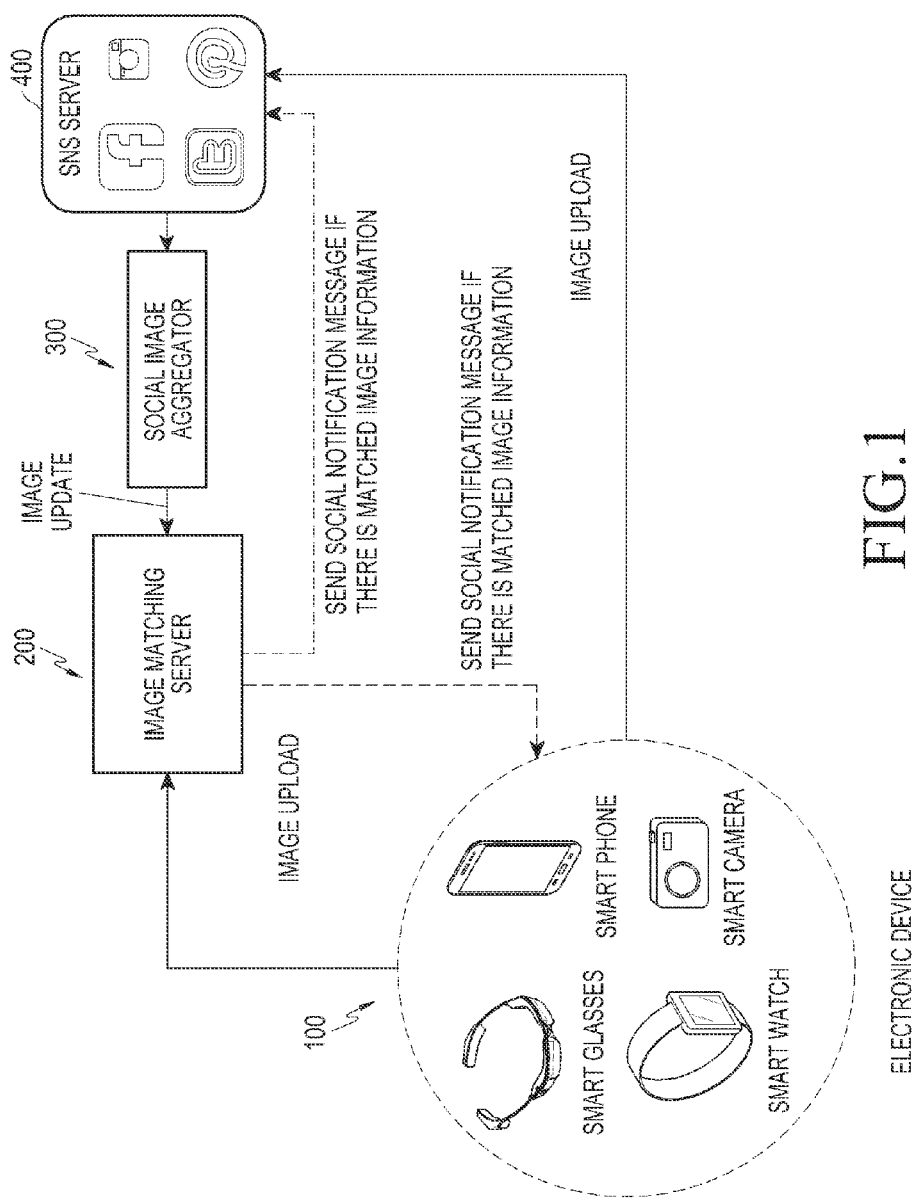
FIG. 1 illustrates an example of a system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms "include" or "may include" used in various embodiments of the present disclosure indicate an existence of disclosed function, operation, or component, but do not limit an existence of one or more other functions, operations, or components. Terms "include" or "has" used in the present disclosure should be understood that they are intended to indicate an existence of feature, number, step, operation, component, item or any combination thereof, disclosed in the specification, but should not be understood that they are intended to previously exclude an existence of one or more other features, numbers, steps, operations, components, or any combination thereof or possibility of adding those things.

The term "or" in various embodiments of the present disclosure includes any or every combination of listed terms. For example, "A or B" may include either A or B, or both A and B.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present disclosure.

When it is said that a component is "connected" or "coupled" with another component, the component may be directly connected with another component, or still another component may exist between the components. On the other hand, when it is said that a component is "directly connected" or "directly coupled" with another component, no component exists between the components.

Terms used in various embodiments of the present disclosure are intended to describe an embodiment of the present disclosure, rather than to limit the various embodiments Unless otherwise defined, all terms (including technical and scientific terms) used herein have the same meaning as commonly understood by one of ordinary skill in the art to which embodiments of the present disclosure belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

An electronic device according to various embodiments of the present disclosure may be a device having a communication function. For example, the electronic device may include at least one of a smart phone, a tablet Personal Computer (PC), a mobile phone, a video phone, an electronic (e-)book reader, a desktop PC, a laptop PC, a netbook computer, a Personal Digital Assistant (PDA), a Portable Multimedia Player (PMP), an Moving Picture Experts Group Audio Layer III (MP3) player, mobile medical equipment, a camera, a wearable device (e.g., a Head-Mounted Device (HMD) such as electronic glasses), an electronic cloth, an electronic bracelet, an electronic necklace, an electronic appcessory, an electronic tattoo, and a smart watch.

According to various embodiments of the present disclosure, the electronic device may be a smart home appliance having a communication function. The smart home appliance may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a TV box (e.g., HomeSync™ of Samsung, TV™ of Apple, or TV™ of Google, a game console, an electronic dictionary, an electronic key, a camcorder, and an electronic frame.

According to various embodiments of the present disclosure, the electronic device may include at least one of various medical equipment (e.g., Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (e.g., navigation system and gyro compass for ships), avionics, and a security device.

According to various embodiments of the present disclosure, the electronic device may include a part of a furniture or building/structure having a communication function, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. It will be obvious to those of ordinary skill in the art that the electronic device according to various embodiments of the present disclosure is not limited to the above-listed devices. Hereinafter, the electronic device according to various embodiments of the present disclosure will be described with reference to the accompanying drawings. The term "user" used in the various embodiments of the present disclosure may indicate a person who uses the electronic device or a device (e.g., an artificial intelligence electronic device) which uses the electronic device.

Hereinafter, an electronic device and a method for providing a notification in an Internet service according to various embodiments of the present disclosure will be described. Although various embodiments of the present disclosure assume an operation in a Social Network Service (SNS) as an example of an Internet service, they may also be applied to other Internet services capable of providing a notification to an electronic device.

FIG. 1 illustrates an example of a system according to various embodiments of the present disclosure.

Referring to FIG. 1, the system proposed in the present disclosure may include an electronic device 100, an image matching server 200, a social image aggregator 300, and an SNS server 400.

The SNS server 400 receives contents from several SNS accounts according to various embodiments of the present disclosure. SNS types may include, for example, Facebook, Instagram, Twitter, Kakao Talk, Google+, Kakao Story, and so forth. Contents may be information a user desires to share with other users through the user's SNS account, such as images like photos or videos, location information, contact information, and so forth. According to various embodiments of the present disclosure, contents newly uploaded through each SNS account may be delivered to the SNS server 400. According to various embodiments of the present disclosure, information about a relationship between user accounts may be stored in the SNS server 400. According to various embodiments of the present disclosure, the SNS server 400 may deliver the uploaded contents to the social image aggregator 300.

According to various embodiments of the present disclosure, the social image aggregator 300 periodically checks the user's SNS account and SNS accounts of related users on the user's SNS account to recognize newly updated contents and upload the newly updated contents to the image matching server 200. The related users may be users who become friends based on friend request and confirm operations between users on a particular SNS account.

While the image matching server 200 and the social image aggregator 300 are illustrated as separate components in FIG. 1, the social image aggregator 300 may be included in the SNS server 400 or the image matching server 200 or may be omitted. In this case, the SNS server 400 or the image matching server 200 may collect images from the SNS server 400 and identify contents information from the collected images according to various embodiments of the present disclosure.

According to various embodiments of the present disclosure, the electronic device 100 may be an image capturing device. The electronic device 100 may also be a device transmitting and receiving captured images to from the SNS server 400 and receiving a social notification message from the image matching server 200. For example, the electronic device 100 may be a smart phone, smart glasses, a smart watch, a smart camera, or the like. According to various embodiments of the present disclosure, an SNS application or program that accesses an SNS account to share contents may be installed in the electronic device 100. The user may execute the SNS application or program to upload contents the user desires to share with other users to the SNS server 400. Through the SNS application or program, the electronic device 100 may recognize from a notification message received from the image matching server 200 that the contents have been uploaded to the SNS server 400. The notification message may be a notification message indicating that contents have been uploaded by another user who is a friend of a user on a particular SNS account. The contents may be an image stored in the electronic device 100, an image stored in a cloud server, an image captured by a camera or an image application provided in the electronic device 100, or the like. According to various embodiments of the present disclosure, the electronic device 100 may deliver the image stored in the electronic device 100 or the captured image to the image matching server 200 or the SNS server 400 through the SNS application or program. According to various embodiments of the present disclosure, the electronic device 100 may deliver a particular image to the image matching server 200 or the SNS server 400 through a sharing function of the image application. According to various embodiments of the present disclosure, the electronic device 100 may receive from the image matching server 200, a notification message indicating that contents of another user, which are related to the delivered contents, have been uploaded.

The image matching server 200 may receive contents directly from the electronic device 100 using at least one SNS account, according to various embodiments of the present disclosure. The image matching server 200 also receives the contents through the social image aggregator 300. According to various embodiments of the present disclosure, the image matching server 200 may store contents information regarding respective received contents. The contents information may information included in the delivered contents. For example, if the delivered contents are an image, the contents information may include a time and an exposure at which the image is captured, whether or not a flash is used at the time of capturing the image, a resolution of the image, a size of the image, a location where the image is captured, a capturing target in the image, and the like. Location information about capturing contents (e.g., an image) delivered from a Global Positioning System (GPS) module included in the electronic device 100 when the electronic device 100 captures the contents (e.g., the image) may also be included in the contents information. According to various embodiments of the present disclosure, the image matching server 200 may recognize and store a relationship between the contents based on the received contents information regarding the received contents.

The image matching server 200 collects contents or contents information regarding the contents according to various embodiments of the present disclosure. The image matching server 200 compares contents newly uploaded from a user account of the electronic device 100 with existing contents of the image matching server 200 based on the contents information. The existing contents of the image matching server 200 may be contents uploaded from an account of another user or contents uploaded from the user account of the electronic device 100. The image matching server 200 may determine whether there is contents information matched to contents information regarding the existing contents among the contents information regarding the contents newly uploaded from the user account. If determining that there are existing contents that are related to the contents of the user account of the electronic device 100, the image matching server 200 sends a social notification message indicating that there are such existing contents to the electronic device 100 or the SNS server 400.

Figure 2:
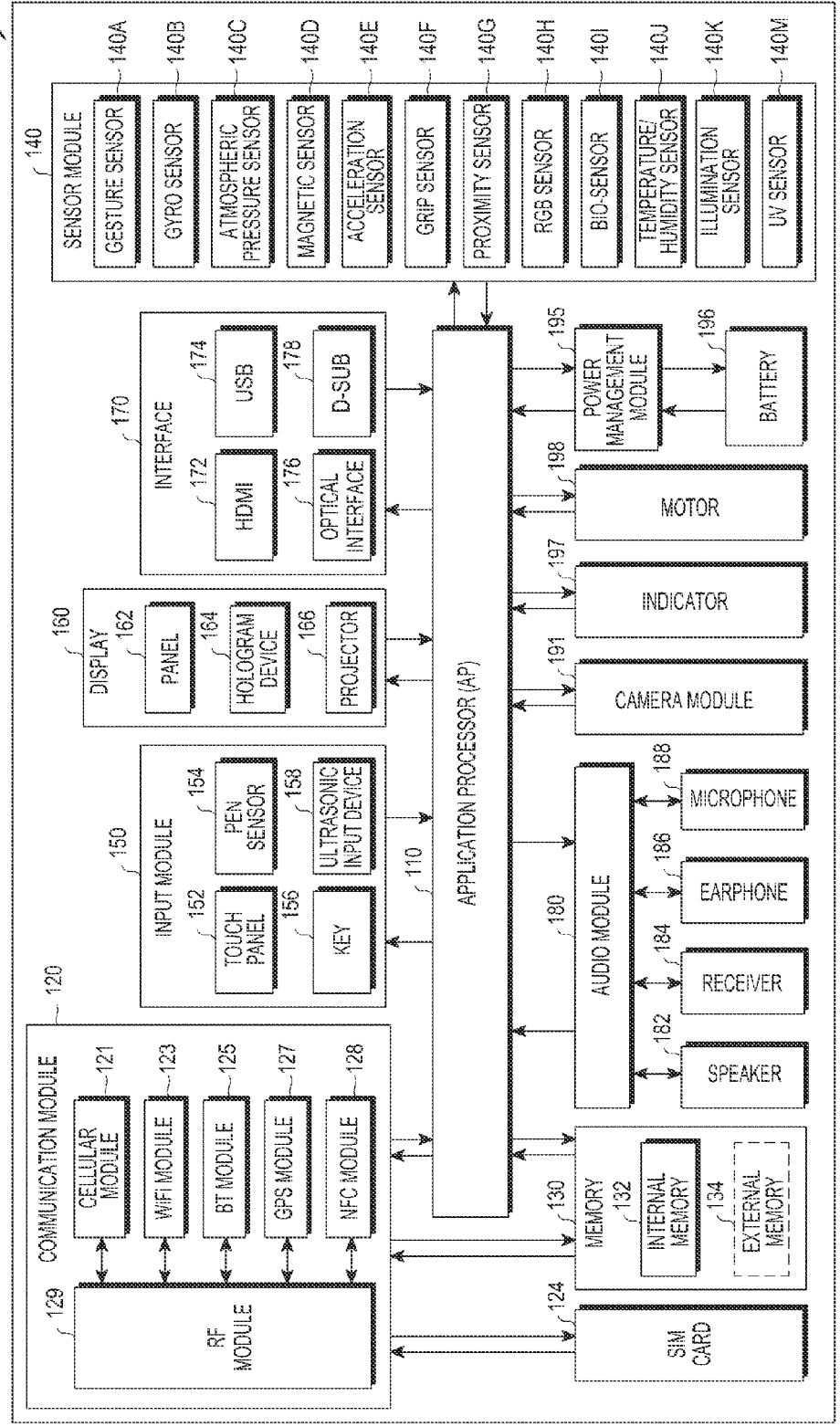
FIG. 2 is a block diagram illustrating an example of an electronic device according to various embodiments of the present disclosure.

FIG. 2 is a block diagram illustrating an example of an electronic device to which various embodiments of the present disclosure may be applied. The electronic device 100 may constitute the entire electronic device 100 illustrated in FIG. 1 or a portion thereof.

Referring to FIG. 2, an electronic device 100 may include one or more processors (e.g., an Application Processor (AP) 110), a communication module 120, a Subscriber Identification Module (SIM) card 124, a memory 130, a sensor module 140, an input device 150, a display 160, an interface 170, an audio module 180, a camera module 191, a power management module 195, a battery 196, an indicator 197, and a motor 198, but is not limited thereto.

The AP 110 drives an Operating System (OS) or an application program to control multiple hardware or software components connected to the AP 110 and to perform processing and operations of various data including multimedia data. The AP 110 may be implemented with, for example, a System on Chip (SoC). According to an embodiment of the present disclosure, the AP 110 may further include a Graphic Processing Unit (GPU, not illustrated).

The communication module 120 may perform data transmission/reception in communication between the electronic device 100 (e.g., the electronic device 100) and other electronic devices (e.g., the image matching server 200 or the SNS server 400) connected through the network. According to an embodiment of the present disclosure, the communication module 120 may include at least one of a cellular module 121, a WiFi module 123, a Bluetooth (BT) module 125, a GPS module 127, a Near Field Communication (NFC) module 128, and a Radio Frequency (RF) module 129.

The cellular module 121 provides at least one of voice communication, video communication, a messaging service, and an Internet service through a communication network (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like). The cellular module 121 may identify and authenticate an electronic device in a communication network by using a subscriber identification module (e.g., the SIM card 124). According to an embodiment of the present disclosure, the cellular module 121 performs at least some of functions provided by the AP 110. For example, the cellular module 121 may perform at least a part of a multimedia control function.

According to an embodiment of the present disclosure, the cellular module 121 may include a Communication Processor (CP). The cellular module 121 may be implemented with, for example, an SoC. Although components such as the cellular module 121 (e.g., the communication processor), the memory 130, or the power management module 195 are illustrated as being separated from the AP 110 in FIG. 2, the AP 110 may be implemented to include at least some (e.g., the cellular module 121) of the foregoing components.

According to an embodiment of the present disclosure, the AP 110 or the cellular module 121 (e.g., the CP) may load a command and/or data received from at least one of a nonvolatile memory connected thereto and other components to a volatile memory and process the received command or data. The AP 110 or the cellular module 121 may store data received from at least one of other components or data generated by at least one of other components in the nonvolatile memory.

Each of the WiFi module 123, the BT module 125, the GPS module 127, and the NFC module 128 may include a processor for processing data transmitted and received through the corresponding module. Although the cellular module 121, the WiFi module 123, the BT module 125, the GPS module 127, and the NFC module 128 are illustrated as separate blocks in FIG. 2, at least some (e.g., two or more) of the cellular module 121, the WiFi module 123, the BT module 125, the GPS module 127, and the NFC module 128 may be included in one Integrated Chip (IC) or IC package. For example, at least some of processors corresponding to the cellular module 121, the WiFi module 123, the BT module 125, the GPS module 127, and the NFC module 128 (e.g., the CP corresponding to the cellular module 121 and a WiFi processor corresponding to the WiFi module 123) may be implemented in one SoC.

The RF module 129 may transmit and receive data, for example, a RF signal. The RF module 129 may include, although not shown, at least one of a transceiver, a Power Amplification Module (PAM), a frequency filter, and a Low Noise Amplifier (LNA). The RF module 129 may further include at least one of parts for transmitting and receiving electromagnetic waves on a free space, for example, a conductor and a conductive wire, in wireless communication. Although the cellular module 121, the WiFi module 123, the BT module 125, the GPS module 127, and the NFC module 128 are illustrated as sharing one RF module 829 in FIG. 2, at least one of the cellular module 121, the WiFi module 123, the BT module 125, the GPS module 127, and the NFC module 128 may transmit and receive an RF signal through a separate RF module according to an embodiment of the present disclosure.

The SIM card 124 may be a card including a subscriber identification module, and may be inserted into a slot formed in a particular position of the electronic device. The SIM card 124 may include unique identification information (e.g., an IC Card Identifier (ICCID)) or subscriber information (e.g., an International Mobile Subscriber Identity (IMSI)).

The memory 130 may include an internal memory 132 or an external memory 134. The internal memory 132 may include at least one selected from among a volatile memory (e.g., a Dynamic Random Access Memory (DRAM), a Static RAM (SRAM), a Synchronous Dynamic RAM (SDRAM), or the like) and a nonvolatile memory (e.g., One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not And (NAND) flash memory, a Not Or (NOR) flash memory, and the like).

According to an embodiment of the present disclosure, the internal memory 132 may be a Solid State Drive (SSD). The external memory 134 may further include a flash drive, for example, at least one of a compact flash, Secure Digital (SD), micro-SD, mini-SD, extreme digital (xD), and a memory stick. The external memory 134 may be functionally connected with the electronic device 100 through various interfaces. According to an embodiment of the present disclosure, the electronic device 100 may further include a storage device (or storage medium) such as a hard drive.

The sensor module 140 measures a physical quantity or senses an operation state of the electronic device 100 to convert the measured or sensed information into an electric signal. The sensor module 140 may include at least one selected from among a gesture sensor 140A, a gyro sensor 140B, a pressure sensor 140C, a magnetic sensor 140D, an acceleration sensor 140E, a grip sensor 140F, a proximity sensor 140G, a Red/Green/Blue (RGB) sensor 140H, a bio sensor 140I, a temperature/humidity sensor 140J, an illumination sensor 140K, an Ultra Violet (UV) sensor 140M, and the like. Additionally or alternatively, the sensor module 140 may include at least one selected from among an E-nose sensor (not illustrated), an Electromyography (EMG) sensor (not illustrated), an Electroencephalogram (EEG) sensor (not illustrated), an Electrocardiogram (EGC) sensor (not illustrated), an Infrared (IR) sensor (not illustrated), an iris sensor (not illustrated), a fingerprint sensor (not illustrated), and the like. The sensor module 140 may further include a control circuit for controlling at least one sensors included therein.

The input device 150 may include a touch panel 152, a (digital) pen sensor 154, a key 156, and an ultrasonic input device 158. The touch panel 152 may recognize a touch input by using at least one of a capacitive, a resistive, infrared, or ultrasonic scheme. The touch panel 152 may further include a control circuit. For the capacitive touch panel 152, recognition of a physical contact or approach is possible. The touch panel 152 may further include a tactile layer. In this case, the touch panel 152 may provide a tactile reaction to a user.

The (digital) pen sensor 154 may be implemented using a method that is the same as or similar to a user's touch input or by using a separate recognition sheet. The key 156 may include a physical button, an optical key, or a keypad. The ultrasonic input device 158 is a device that allows the electronic device 100 to sense ultrasonic waves, input using an input means that generates an ultrasonic signal, through a microphone (e.g., a microphone 188), and to check data. The ultrasonic input device 158 is capable of performing wireless recognition. According to an embodiment of the present disclosure, the electronic device 100 may receive a user input from an external electronic device (e.g., a computer or a server) connected thereto by using the communication module 820.

The display 160 may include a panel 162, a hologram device 164, and a projector 166. The panel 162 may be, for example, a Liquid Crystal Display (LCD), an Active-Matrix Organic Light-Emitting Diode (AMOLED), or the like. The panel 162 may be implemented as being flexible, transparent, and wearable. The panel 162 may be implemented with the touch panel 152 as one module. The hologram device 164 may show a stereoscopic image in the air by using interference of light. The projector 166 may project light onto the screen to display an image. The screen may be positioned inside or outside the electronic device 100. According to an embodiment of the present disclosure, the display 160 may further include a control circuit for controlling the panel 162, the hologram device 164, or the projector 166.

The interface 170 may include a High-Definition Multimedia Interface (HDMI) 172, a Universal Serial Bus (USB) 174, an optical interface 176, and a D-subminiature (D-SUB) 178. Additionally or alternatively, the interface 170 may include a Mobile High-definition Link (MHL) interface, an SD card/Multimedia Card (MMC) interface, or an infrared Data association (IrDA) standard interface.

The audio module 180 bi-directionally converts sound and an electric signal. The audio module 180 may process sound information input or output through at least one of a speaker 182, a receiver 184, an earphone 186, and the microphone 188.

The camera module 191 is a device capable of capturing still and moving images, and according to an embodiment of the present disclosure, the camera module 191 may include one or more image sensors (e.g., a front sensor or a rear sensor), a lens (not illustrated), an Image Signal Processor (ISP, not illustrated), or a flash (not illustrated, for example, a Light Emitting Diode (LED) or a xenon lamp).

The power management module 195 may manage power of the electronic device 100. Although not shown, a Power Management IC (PMIC), a charger IC, or a battery or fuel gauge may be included in the power management module 195.

The PMIC may be mounted in, for example, an IC or an SoC semiconductor. The charging method may be classified into a wired type and a wireless type. The charger IC may charge a battery, and may prevent introduction of an over-voltage or over-current from a charger. According to an embodiment of the present disclosure, the charger IC may include a charger IC for at least one of a wired charging method and a wireless charging method. The wireless charging method may include, for example, a magnetic resonance method, a magnetic induction method, or an electromagnetic wave method, and an additional circuit for wireless charging, for example, a coil loop, a resonance circuit, or a rectifier may be added for the wireless charging method.

The battery gauge measures the remaining capacity of the battery 196, and a voltage, a current, or a temperature of the battery 196 during charging. The battery 196 stores or produces electricity and supplies power to the electronic device 100 by using the stored or produced electricity. The battery 196 may include a rechargeable battery or a solar battery.

The indicator 197 may display a particular state, for example, at least one of a booting state, a message state, and a charging state, of the electronic device 100 or a part thereof (e.g., the AP 110). The motor 198 may convert an electric signal into mechanical vibration. Although not shown, a processing unit for supporting mobile TVs (e.g., a GPU) may be included in the electronic device 100. The processing unit for supporting mobile TVs may process media data complying with, for example, Digital Multimedia Broadcasting (DMB), Digital Video Broadcasting (DVB), or a media flow.

For example, an electronic device to which various embodiments of the present disclosure may be applied may include a communication module, a display, and a processor. The processor controls the communication module to transmit first contents to a server and to receive a notification message regarding second contents including information of the first contents from the server and controls the display to display the notification message. The processor to which various embodiments of the present disclosure may be applied may control the display to display a social reaction message inviting a reaction to the first contents. The processor may generate the social action message including a selection item for uploading contents related to the first contents. The processor may generate the social reaction message including a selection item for inputting a user's reaction to the first contents and a selection item for transmitting the input user's reaction to the at least one second user.

Figure 3:
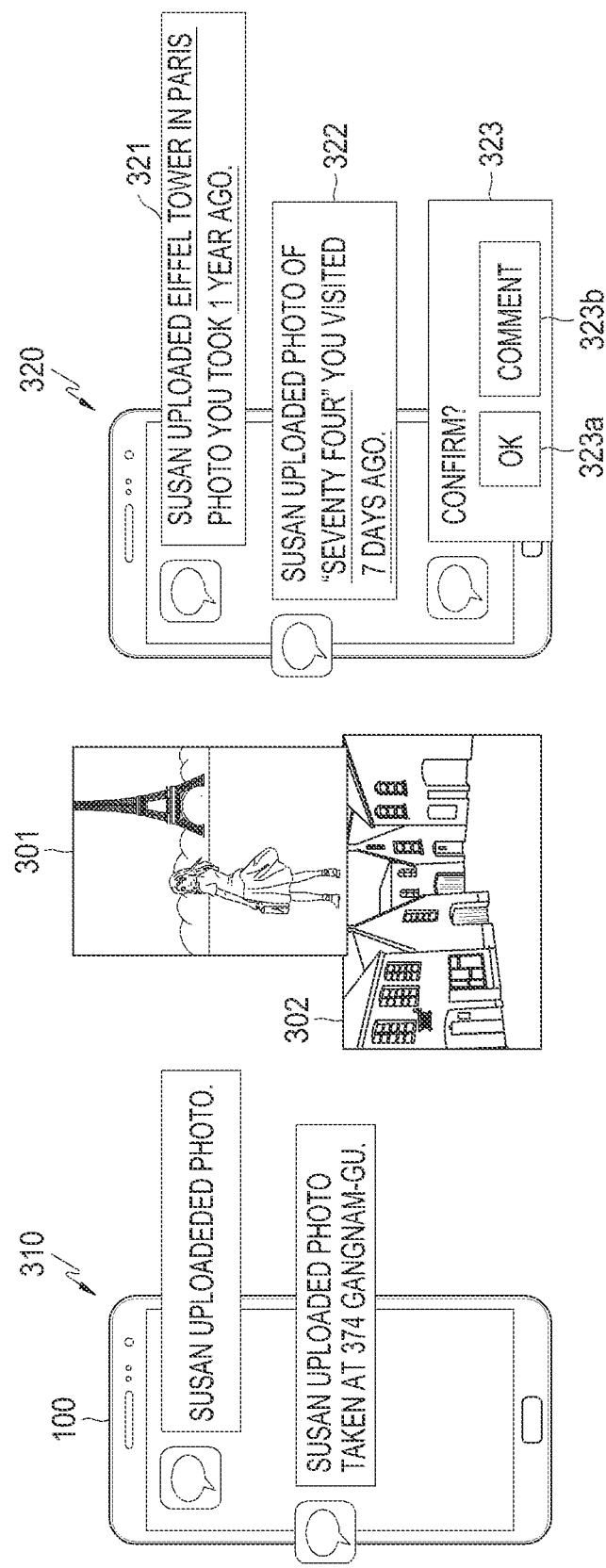
FIG. 3 illustrates comparison of an example of a social notification message displayed on an electronic device according to various embodiments of the present disclosure.

FIG. 3 illustrates comparison of an example of a social notification message displayed on an electronic device according to various embodiments of the present disclosure.

Referring to FIG. 3, it is assumed that a user, Susan, uploads a photo 301 of her and the Eiffel Tower taken in front of the Eiffel Tower and a photo 302 of "Seventy Four" taken in "374 Gangnam-gu" to her SNS account.

An existing notification message 310 notifies an SNS account of a user (e.g., the user of the electronic device 100) of information indicating "Susan uploaded photo" for the photo 301. As the existing notification message 310 including information indicating "Susan uploaded photo taken at 374 Gangnam-gu" for the photo 302 is transmitted to the user's SNS account, it may indicate that the photo 302 taken by Susan has been taken in "374 Gangnam-gu".

In comparison, a notification message 320 according to an embodiment of the present disclosure may indicate that an image is uploaded by "Susan" who is an SNS friend of the user, and also display a social notification message 321 indicating that the "Eiffel Tower" photo taken by "Susan" is a place the user visited "1 year ago". According to the foregoing embodiment of the present disclosure, the social notification message 321 may include information such as "Susan uploaded Eiffel Tower in Paris photo you took 1 year ago".

The notification message 320 according to an embodiment of the present disclosure may indicate for the photo 302 that a place where Susan took a photo is a place the user visited "7 days ago" and a capturing target of which Susan took a photo is "Seventy Four". According to the foregoing embodiment of the present disclosure, the social notification message 322 may include information indicating that "Susan uploads a photo of "Seventy Four" you visited "7 days ago"".

Moreover, the electronic device 100 according to an embodiment of the present disclosure may further display a social action message 323 inviting a user's reaction to contents. For example, the social action message 323 may include "Ok 323a" that provides a function allowing a user to access and see contents whose uploading is indicated by the social notification message 322 and "Comment 323b" that provides a function allowing the user to leave a comment on the contents.

Figure 4:
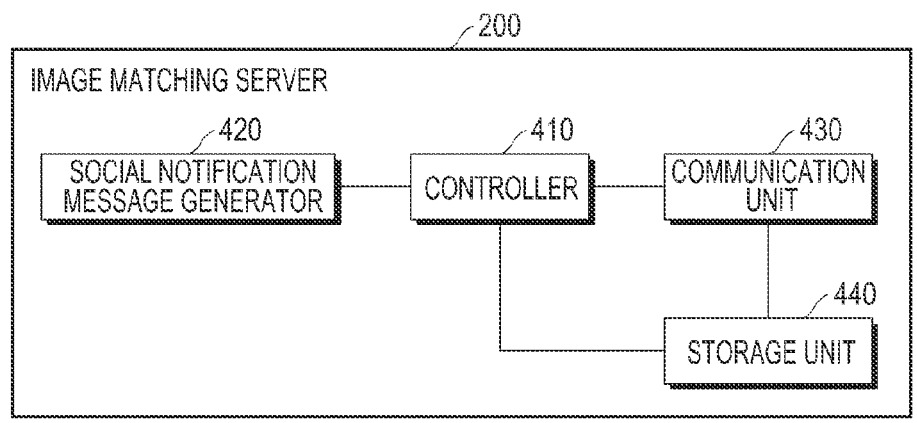
FIG. 4 is a block diagram illustrating an example of an image matching server according to various embodiments of the present disclosure.

FIG. 4 is a block diagram illustrating an example of an image matching server according to various embodiments of the present disclosure.

Referring to FIG. 4, the image matching server 200 may include a controller 410, a social notification message generator 420, a communication unit 430, and a storage unit 440.

The controller 410 controls overall operations of the image matching server 200. For example, once recognizing that another user connected with the user on an SNS uploads new contents, the controller 410 may determine whether the new contents are related to the user, based on contents information regarding the contents. Thereafter, the controller 410 controls a social notification message indicating that the new contents have been uploaded to be generated. According to various embodiments of the present disclosure, the controller 410 controls the generated social notification message to be delivered to the user account. The social notification message delivered to the user account may be displayed through, for example, a social network application of the electronic device 100 of the user. According to various embodiments of the present disclosure, the controller 410 may control the social notification message to be sent to an SNS account of another user such that the other user may recognize user-related contents. According to various embodiments of the present disclosure, the social notification message may be controlled to be delivered through the SNS server or to be directly delivered to the electronic device 100 of the user or an electronic device of the other user.

The communication unit 430 receives contents from at least one electronic device (e.g., the electronic device 100), the social image aggregator 300, or at least one SNS account. According to various embodiments of the present disclosure, when contents are received from at least one electronic device, corresponding account information or another account information related to that account may be notified. According to various embodiments of the present disclosure, the communication unit 430 may send the social notification message to at least one electronic device or at least one SNS account.

According to various embodiments of the present disclosure, the social notification message generator 420 may perform an image matching operation of comparing previously received contents with contents newly uploaded from at least one SNS account. Based on the comparison result, a social notification message regarding the newly uploaded contents may be generated. A detailed description will be later made of the image matching operation for generating the social notification message in the social notification message generator 420 with reference to FIG. 5.

The storage unit 440 stores received contents or contents information regarding the respective received contents. According to various embodiments of the present disclosure, the storage unit 440 may store a relationship between user accounts or a relationship between contents based on contents information.

For example, the server to which various embodiments of the present disclosure may be applied may include a communication unit 430, a social notification message generator 420 configured to generate a social notification message, and a controller 410. The controller 410 may compare previously received contents with first contents, if recognizing the first contents that are new contents from a first user, may control the social notification message generator 420 to generate a notification message indicating that the first contents related with second contents are uploaded, if the second contents including at least a part of information of the first contents exist among information of the previously received contents, and may control the communication unit 430 to send the generated notification message to at least one user who uploads the first contents or the second contents. The controller 410 according to various embodiments of the present disclosure may control the communication unit 430 to send the generated notification message to at least one second user, if the first contents are uploaded from the at least one second user who has a relationship with the first user on an SNS account. The controller 410 may generate the notification message including information regarding a relationship between the information of the first contents and information of the second contents. The information of the first contents or the information of the second contents may include at least one of location information, time information, capturing target information, exposure, whether to use a flash, a resolution, a size of contents, information of the first user, and information of the at least one second user. The information regarding a relationship may be information indicating that the first contents are captured in a location that is similar to a location where the second contents are captured, if the information of the second contents includes location information corresponding to the first contents. The information regarding a relationship may be information indicating that the first contents are obtained by capturing a target that is similar to that of contents of the first user, if the information of the second contents includes capturing target information corresponding to the first contents.

Figure 5:
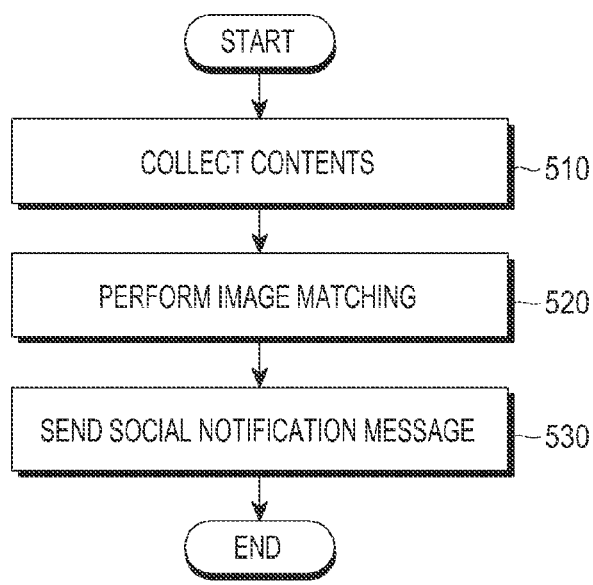
FIG. 5 is a flowchart illustrating an example of an operation flow of an image matching server according to an embodiment of the present disclosure.

FIG. 5 is a flowchart illustrating an example of an operation flow of an image matching server according to an embodiment of the present disclosure.

Referring to FIG. 5, in operation 510, the image matching server 200 receives contents from at least one SNS account or an electronic device 100. Thereafter, the image matching server 200 collects contents information regarding the received contents from the received contents.

In operation 520, the image matching server 200 performs an image matching operation of determining whether contents including contents information corresponding to the received contents exist among previously collected contents information.

If the received contents are image-matched, the image matching server 200 sends, to an SNS account or an electronic device 100 from which the matched contents have been transmitted, a social notification message indicating that the received contents are related to the previously collected contents. The image matching server 200 also sends the social notification message to the SNS server 400.

For example, a notification method of a server in an Internet service according to various embodiments of the present disclosure may include comparing previously received contents with first contents, if recognizing the first contents that are new contents from a first user, generating a notification message indicating that the first contents related with second contents are uploaded, if the second contents including at least a part of information of the first contents exist among information of the previously received contents, and sending the generated notification message to at least one user who uploads the first contents or the second contents. The notification method may further include sending the generated notification message to at least one second user, if the first contents are uploaded from the at least one second user who has a relationship with the first user on an SNS account. The generated notification message may further include information regarding a relationship between the information of the first contents and information of the second contents.

The information of the first contents or the information of the second contents may include at least one of location information, time information, capturing target information, exposure, whether to use a flash, a resolution, a size of contents, information of the first user, and information of the at least one second user.

The information regarding a relationship may be information indicating that the first contents are captured in a location that is similar to a location where the second contents are captured, if the information of the second contents includes location information corresponding to the first contents. The information regarding a relationship may be information indicating that the first contents are obtained by capturing a target that is similar to that of contents of the first user, if the information of the second contents includes capturing target information corresponding to the first contents.

Figure 6A:
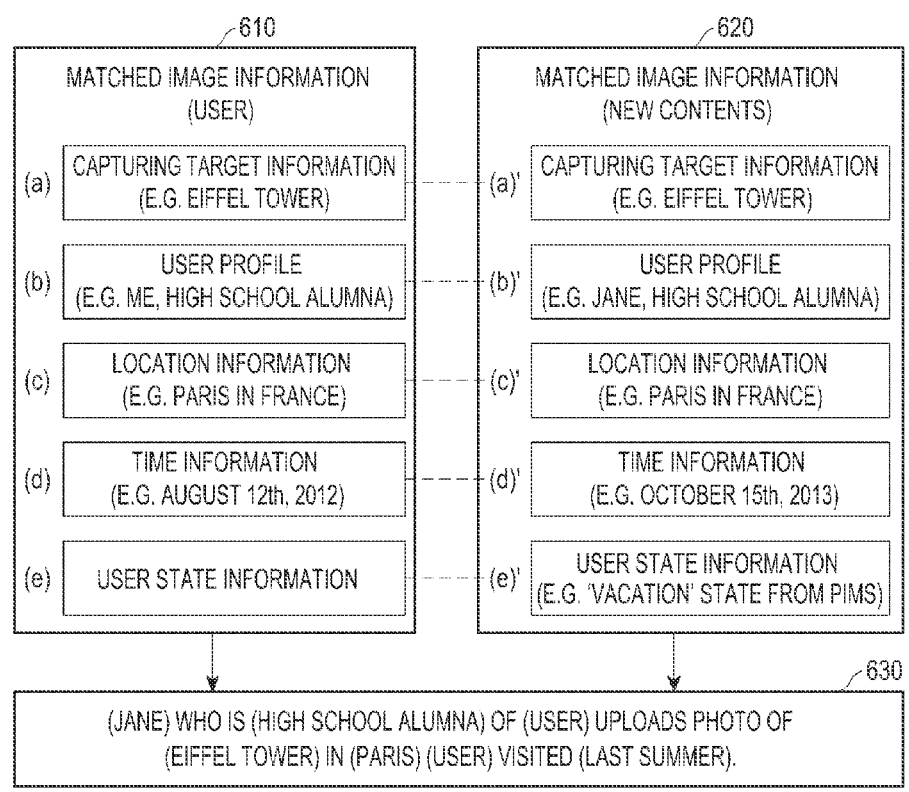
FIG. 6A illustrates an example of an image matching operation for generating a social notification message according to an embodiment of the present disclosure.

FIG. 6A illustrates an example of an image matching operation for generating a social notification message according to an embodiment of the present disclosure.

Referring to FIG. 6A, the social notification message generator 420 performs an image matching operation of comparing collected contents with contents information regarding respective contents newly uploaded from at least one SNS account.

Herein, it is assumed that as a result of the image matching operation, the collected contents include contents information regarding the newly uploaded contents. Such contents information will be defined as matched contents information.

The matched contents information may include, for example, contents information regarding contents collected from the electronic device 100 and contents information regarding new contents. For example, matched contents information 610 may include (a) Capturing Target Information, (b) User Profile, (c) Location Information, (d) Time Information, and (e) User State Information.

For example, (a) Capturing Target Information may be contents information corresponding to capturing in common between the matched contents information. The capturing target information may concern a target to be captured. The image matching server 200 may determine the matched contents information to concern the same target, if the matched contents information is matched to the same image as the capturing target or is classified into the same sub-category as the capturing target in spite of a different form. For example, it may be assumed that both collected contents and new contents are contents obtained by capturing "the Eiffel Tower". In this case, if the collected contents are a photo taken from the front of the Eiffel Tower and the new contents are a photo taken under the Eiffel Tower, the photos of the Eiffel Tower are different from each other and thus it may be determined that different targets are captured. The image matching server 200 may determine that both contents are photos of "the Eiffel Tower" and include the same capturing target information.

(b) User Profile is information about a user who has uploaded contents, and may include, for example, a name of the user, school information of the user, a location where the user lives, and contact information of the user. (c) Location Information may include a location where contents have been uploaded or captured. (d) Time Information may include the time when the contents have been uploaded or captured. (e) User State Information may be information about a state of a user of an SNS account when contents are uploaded. For example, the user state information may be arbitrarily set by the user to "Business Trip", "Vacation", and the like. The user state information may also be set to state information delivered from a Personal Information Management System (PIMS), a calendar, or a schedule management program of the electronic device 100 at the time of uploading or capturing the contents.

It may be assumed that the capturing target information of the contents to be indicated by the social notification message is location information "Paris". Thus, the social notification message may indicate that, for example, "(b) Jane" is in "(c) Paris" the user has visited.

The image matching server 200 delivers the generated social notification message to the electronic device 100 or the SNS server 400. The electronic device 100 having received the social notification message controls the social notification message to be displayed on a display.

Referring to FIG. 6A, it is assumed that both the contents collected from the user and the new contents are the same image obtained by capturing "the Eiffel Tower" and the respective contents include matched contents information including (a) Capturing Target Information regarding "the Eiffel Tower". Thus, the image matching server 200 may generate a social notification message including the capturing target information.

For example, user's matched contents information 610 may include (a) the Eiffel Tower, (b) High School Alumna, (c) Paris in France, and (d) Aug. 12, 2012. On the other hand, matched contents information 620 of the new contents may include (a)' the Eiffel Tower, (b)' Jane, High School Alumna, (c)' Paris in France, (d)' Oct. 15, 2013, and (e)' Vacation delivered from PIMS.

Hence, the social notification message generator 420 of the image matching server 200 may interpret from the social notification message regarding the new contents that the new contents have been obtained by "capturing (a) located in (c) the user visited on (d) during (e), by (b) who has a relationship of (b) with the user". Therefore, a social notification message 630 to which such an example is applied may indicate that "Jane who has a relationship of a high school alumna with the user uploads a photo of the Eiffel Tower located in Paris the user visited last summer during her vacation".

Herein, (d) Time Information of the generated social notification message may be displayed as an actual date, "month day, yyyy (year)". On the other hand, the image matching server 200 may also display (d) Time Information of the social notification message as "Last Summer" or "This Autumn" as suggested in the foregoing example for user friendliness.

Figure 6B:
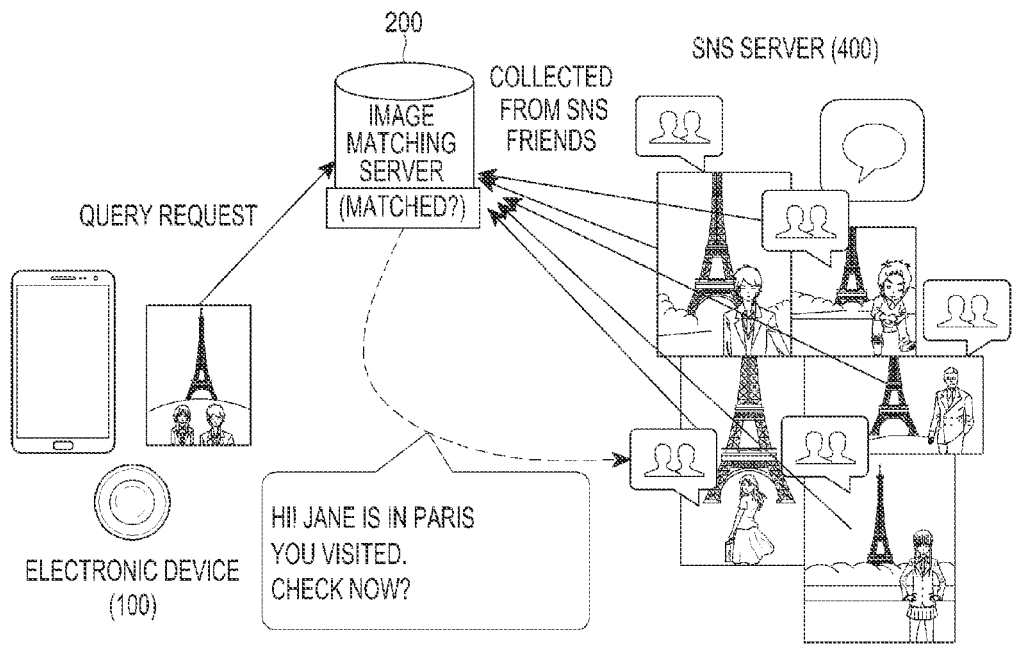
FIG. 6B illustrates an example of a notification operation of a server and an example of a message generated in the notification operation in an electronic device according to various embodiments of the present disclosure.

FIG. 6B illustrates an example of a notification operation of a server and an example of a message generated by the notification operation in an electronic device according to an embodiment of the present disclosure.

Referring to FIG. 6B, the electronic device 100 sends a query request to the image matching server 200. The query request may include contents information designated by the electronic device 100 among contents information. The image matching server 200 having received the query request performs an image matching operation, taking the contents information included in the query request into account. In the description made referring to FIG. 6B, the query request may include "Capturing Target Information" among the contents information.

For example, it may be assumed that the capturing target information of contents to be indicated by the social notification message is location information, "Paris". Thus, the social notification message may indicate that, for example, "Hi! "(b) Jane" is in "(c) Paris" you (herein, the user of the electronic device 100) has visited". The image matching server 200 delivers the generated social notification message to the electronic device 100 or the SNS server 400. The electronic device 100 having received the social notification message controls the received social notification message to be displayed on a display.

According to various embodiments of the present disclosure, the electronic device 100 may generate a social action message inviting a user's reaction based on the social notification message. The social action message may include a text like "Check Now?" to invite the user to check a photo of Jane situated in Paris and a button to perform an execution operation. If the execution operation is performed by the user of the electronic device 100, the electronic device 100 controls a display to switch to a screen of an account from which the contents are uploaded. The social action message may allow the user to respond to the social notification message. The social action message may also invite the user to access a page of a Jane's SNS account and check the corresponding photo.

Figure 7:
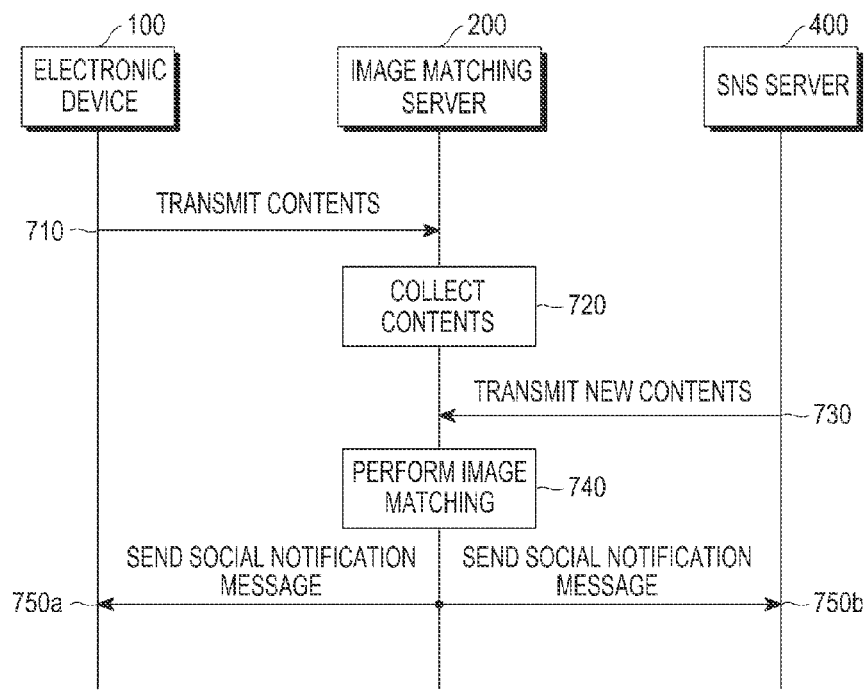
FIGS. 7, 8, and 9 are ladder diagrams illustrating various examples of an operation flow of transmitting a social notification message in an electronic device, an image matching server, and a Social Network Service (SNS) server according to various embodiments of the present disclosure.

FIG. 7 is a ladder diagram illustrating an example of an operation flow of sending and receiving a social notification message in an electronic device, an image matching server, and an SNS server according to various embodiments of the present disclosure.

Referring to FIG. 7, in operation 710, the electronic device 100 delivers contents stored in the electronic device 100 to the image matching server 200. For example, if contents are stored in a cloud or an external memory from the electronic device 100, the image matching server 200 may sense that the contents are stored and receive the stored contents. According to various embodiments of the present disclosure, the electronic device 100 may deliver the contents at specified intervals or at arbitrary intervals set by the user.

In operation 720, according to various embodiments of the present disclosure, the image matching server 200 collects received contents or contents information regarding the received contents from the electronic device 100. The image matching server 200 may also collect received contents and contents information regarding the received contents from the SNS server 400, though not shown in FIG. 7.

In operation 730, according to various embodiments of the present disclosure, if new contents are input from at least one another SNS account having a relationship with a user's SNS account (e.g., a user account of an SNS application connected in the electronic device 100) on an SNS, the SNS server 400 transmits the input contents to the image matching server 200.

In operation 740, according to various embodiments of the present disclosure, the image matching server 200 performs an image matching operation of checking the collected contents information and determining whether contents including contents information regarding the new contents exist among the collected contents. For example, as a result of the image matching operation, contents related to the new contents may exist among the collected contents. In this case, the image matching server 200 may notify the user's SNS account (or the electronic device 100 in which the user's SNS account is connected) of the uploading of the new contents related to at least one of the collected contents.

In operation 750a, according to various embodiments of the present disclosure, the image matching server 200 sends a social notification message to the user's SNS account (or the electronic device 100 in which the user's SNS account is connected) to notify the SNS account (or the electronic device 100) of the uploading of the new contents.

In operation 750b, according to various embodiments of the present disclosure, the image matching server 200 sends the social notification message to the SNS server 400 to notify another user account related with the user of the electronic device 100 on the SNS account that contents related to the new contents exist. The social notification message sent by the image matching server 200 in operation 750b may be a message indicating that the contents related to the contents newly uploaded from the electronic device 100 among the contents collected from the SNS server 400 are related to contents that have been already uploaded on the related SNS account of another user.

Figure 8:
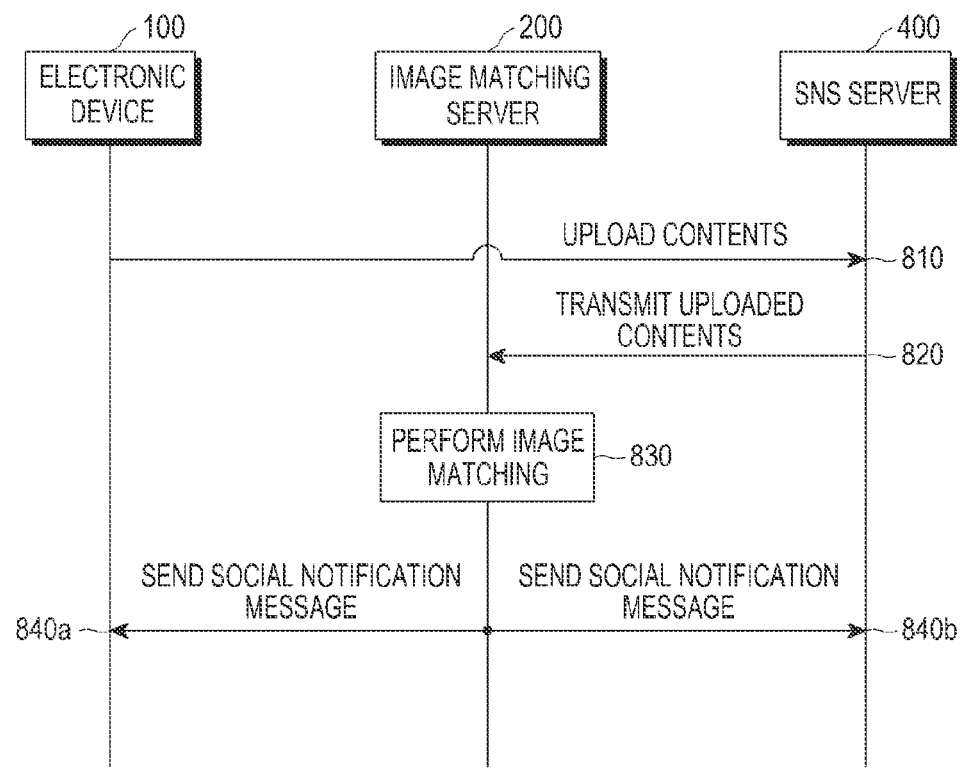

FIG. 8 is a ladder diagram illustrating another example of an operation flow of sending a social notification message in an electronic device, an image matching server, and an SNS server according to various embodiments of the present disclosure.

Referring to FIG. 8, in operation 810, the electronic device 100 uploads contents directly to the SNS server 400. For example, the electronic device 100 may access a particular SNS account to upload contents or may upload contents through an application or a program connected to the particular SNS account. Thus, the SNS server 400 may check the contents uploaded from the electronic device 100.

In operation 820, the SNS server 400 transmits the uploaded contents to the image matching server 200. In operation 830, the image matching server 200 performs an image matching operation of comparing the transmitted contents with previously collected contents. In operation 840*a*, based on the image matching operation, the image matching server 200 sends a social notification message to the electronic device 100. In operation 840*b*, the image matching server 200 sends the social notification message that has been sent to the electronic device 100 also to the SNS server 400.

For example, if contents uploaded from the electronic device 100 to the SNS server 400 are related to contents previously delivered from the electronic device 100 to the image matching server 200 or includes contents information that is common with contents uploaded from a particular SNS account, the image matching server 200 may send a social notification message indicating that the uploaded contents are related to previously delivered contents to the electronic device 100 or the SNS server 400.

Hence, the user of the electronic device 100 uploads contents to the SNS account and receives feedbacks from other users who are interested in the uploaded contents. As reactions to the contents increase, SNS activities between users may become active. In this case, an expected reaction of the user may be, for example, as follows:

<After taking a photo of the Eiffel Tower in Paris and then uploading the photo to the SNS account, I got on the bus to the Arc de Triomphe and in the bus, my smartphone showed me a social notification message to indicate that the location of the Eiffel Tower of which I took the photo is the location my SNS friend, James visited five years ago. For reference, the SNS server 400 may periodically transmit contents previously uploaded by "my" SNS friend "James" to the image matching server 200. The image matching server 200 performs an image matching operation on contents periodically received by my smartphone and contents previously uploaded by James to determine that the location where I captured the contents is the location James visited before.>

Figure 9:
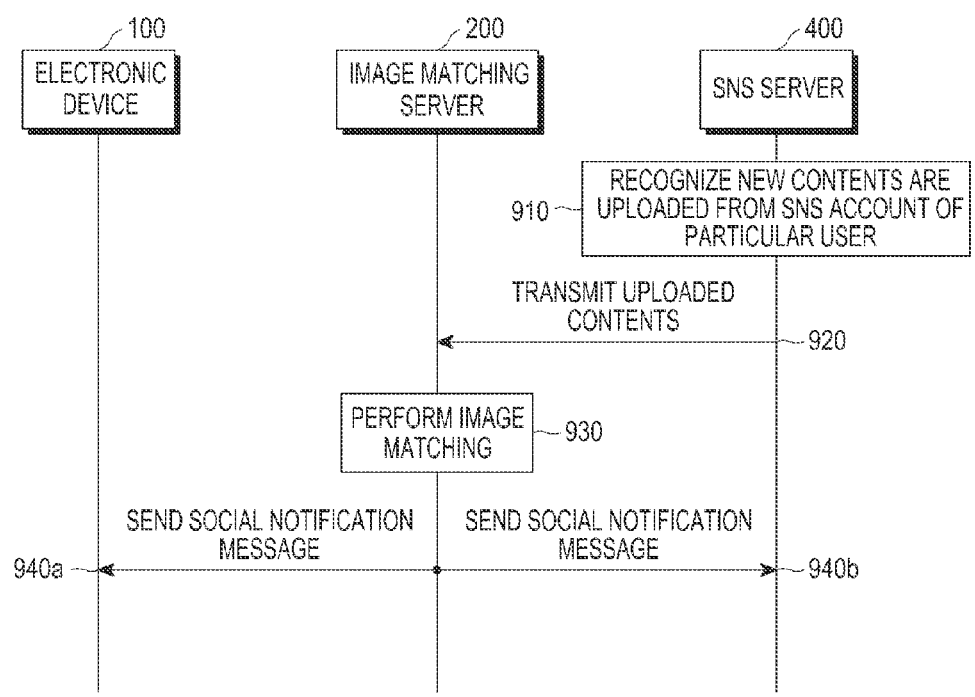

FIG. 9 is a ladder diagram illustrating another example of an operation flow of transmitting a social notification message in an electronic device, an image matching server, and an SNS server according to an embodiment of the present disclosure.

Referring to FIG. 9, in operation 910, the SNS server 400 recognizes that new contents are uploaded from an SNS account of a particular user. In operation 920, the SNS server 400 transmits the newly uploaded contents to the image matching server 200. In operation 930, the image matching server 200 performs an image matching operation of checking the transmitted contents to determine whether contents related to the transmitted contents exist. If the contents related to the transmitted contents exist, the image matching server 200 sends a social notification message to the electronic device 100 or the SNS server 400 in operation 940*a* or 940*b*.

For example, if another user uploads contents that may form a common interest with the user of the electronic device 100 to an SNS account of the other user, then the image matching server 400 may notify the electronic device 100 or the SNS account of the other user that the contents that may form the common interest with the user of the electronic device 100 have been uploaded. In this case, the following reaction may be expected from the user:

<My SNS friend, James has recently come to enjoy posting his impressions, together with highlight images, after watching a soap drama. James has become interested in auto camping as we went camping together during weekends. James posted to his SNS account today, his impressions on the soap drama and auto-camping, especially, a review on a tent I had recommended. An alarm rang in my smartphone, so I checked the smartphone. The social notification message indicated that James has posted a review after using the tent I had recommended on my SNS account.>

Figure 10:
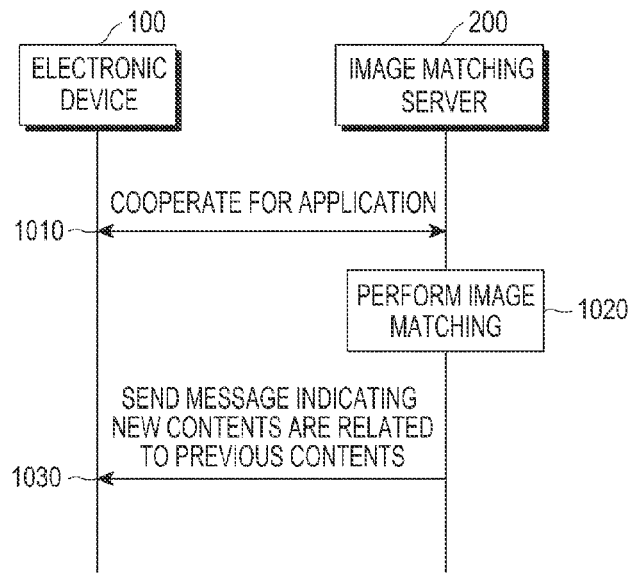
FIG. 10 is a ladder diagram illustrating an example of an operation flow of transmitting a social notification message in an electronic device and an image matching server according to various embodiments of the present disclosure.

FIG. 10 is a ladder diagram illustrating an example of an operation flow of transmitting a social notification message in an electronic device and an image matching server according to various embodiments of the present disclosure.

Referring to FIG. 10, in operation 1010, the electronic device 100 and the image matching server 200 are assumed to cooperate with each other for a particular application. For example, the application may be an application for storing a taken photo. Thus, each time when a new photo is stored, the new photo may be transmitted to the image matching server 200 without a user's separate transmission operation in the electronic device 100. In operation 1020, the image matching server 200 performs an image matching operation of checking the transmitted contents to determine whether contents related to the transmitted contents exist. If the contents related to the transmitted contents exist, the image matching server 200 sends a social notification message to the electronic device 100 in operation 1030. The image matching server 200 may also send the social notification message to an SNS account of another user related with the user of the electronic device 100, though not shown.

Thus, through the social notification message, the user of the electronic device 100 may determine whether the contents just captured by the user are related to previously stored contents (e.g., contents stored in the electronic device 100), without performing a separate search operation.

Figure 11:
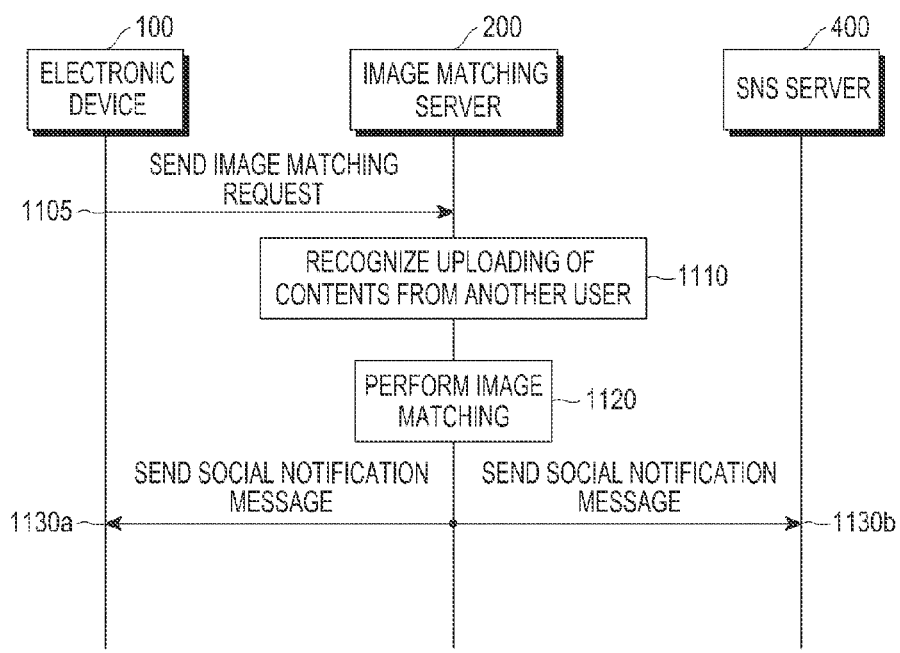
FIG. 11 is a ladder diagram illustrating another example of an operation flow of transmitting a social notification message in an electronic device, an image matching server, and an SNS server according to various embodiments of the present disclosure.

FIG. 11 is a ladder diagram illustrating another example of an operation flow of sending a social notification message in an electronic device, an image matching server, and an SNS server according to various embodiments of the present disclosure.

Referring to FIG. 11, in operation 1105, the electronic device 100 sends an image matching request to the image matching server 200. For example, the user of the electronic device 100 may request image matching to determine whether contents of another user including contents information that is common with user's contents stored in the image matching server 200 or the SNS server 400 are uploaded. In operation 1110, the image matching server 200 recognizes contents uploaded from at least one electronic device or at least one SNS account. In operation 1120, the image matching server 200 performs an image matching operation of determining whether contents related with the contents uploaded in the electronic device 100 exist among the contents recognized in operation 1110. If the contents related with the transmitted contents exist, the image matching server 200 sends to the electronic device 100 a social notification message indicating that the contents are uploaded from a particular SNS account and the contents uploaded from the SNS account are related with the contents uploaded in the electronic device 100 in operation 1130*a*. In operation 1130*b*, the image matching server 200 sends to the SNS server 400 a social notification message indicating that the contents uploaded from the particular SNS account are related with the contents uploaded by another user (herein, the user of the electronic device 100).

Figure 12:
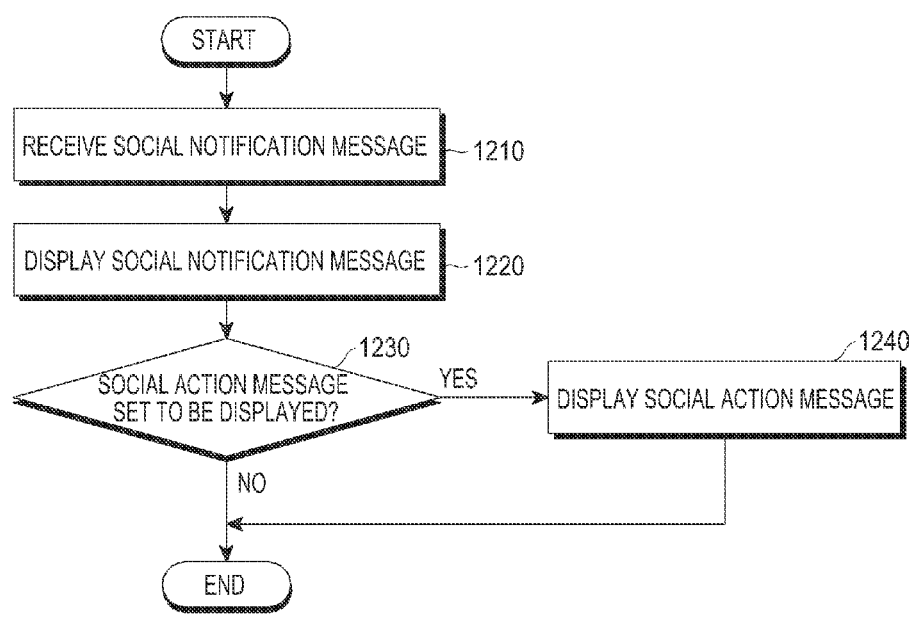
FIG. 12 is a flowchart illustrating an example of an operation flow of an electronic device according to an embodiment of the present disclosure.

FIG. 12 is a flowchart illustrating an operation flow of the electronic device 100 according to an embodiment of the present disclosure.

Referring to FIG. 12, according to various embodiments of the present disclosure, in operation 1210, the electronic device 100 receives a social notification message indicating that contents related with contents uploaded from an SNS account of another user or the electronic device 100 are uploaded. In operation 1220, the electronic device 100 sends the received social notification message to a display to allow the user of the electronic device 100 to check the social notification message.

In operation 1230, the electronic device 100 determines whether a social action message is set to be displayed. The social action message may be a message inviting an action of the user of the electronic device 100 after the social notification message is displayed. If the social action message is set to be displayed, the electronic device 100 controls the display to output the social action message, thus allowing the user to check the social action message, in operation 1240.

As such, according to various embodiments of the present disclosure, the electronic device 100 may display a social notification message indicating that contents including contents information that is common with contents previously uploaded from the electronic device 100 or at least one another SNS account are uploaded to the electronic device 100 or the at least one another SNS account.

For example, the electronic device to which various embodiments of the present disclosure are applicable displays a social action message inviting user's operations that may be performed on contents uploaded by another user related with a user on the SNS account. The social action message may include a function for accessing and checking contents for which the social notification message notifies uploading, a function for leaving a comment on the contents, a function of searching for and uploading other contents that are similar with the contents, and the like.

Thus, the social notification message may invite a proper reaction from other users on the contents uploaded by the user of the electronic device 100 on the SNS account. The following reaction may be expected from the user:

<James, my SNS friend, has recently become interested in auto-camping. James purchased the tent I posted on my SNS account, and uploaded the review on the tent on his account. An alarm rang on my smartphone, so I checked the smartphone. The social notification message indicated James uploaded the review on the tent I posted on my SNS account. 'He finally bought it'. I wondered details he uploaded, so I executed a function "Access James' account to see a photo of the tent?" in the social action message. Then, I could visit the James' account and I left a comment on the photo of the tent James had uploaded.>

<I just uploaded a photo of the Eiffel Tower I took in Paris on my SNS account. Then, my smartphone notified me through the social notification message that the photo of the Eiffel Tower I just took had also been taken by my friend James and a photo of the Eiffel Tower he took had also been uploaded on his SNS account. I thought that 'He had also been there. I better got to upload my photo to let him know.' So, I executed a function "Upload the photo of the Eiffel Tower o which James also took a photo on your SNS account?" in the social action message connected to the social notification message. Upon execution of the function, a list of photos of the Eiffel Tower among photos stored in the smartphone was automatically shown. I uploaded the photo taken with a background of the Eiffel Tower among the shown photos and left comments under the photos. One minute later, James left a comment on the photo taken with the background of the Eiffel Tower. How did he know that? Maybe, the social notification message indicating the Eiffel Tower photo I just uploaded on the SNS account is the photo of the place James also had visited was transmitted to James. James left a comment that the photo reminded him of a memory in Paris. 'Dude . . . '>

For example, according to various embodiments of the present disclosure, a notification method of an electronic device in an Internet service may include transmitting first contents to a server, receiving a notification message regarding second contents including information of the first contents from the server, and displaying the notification message.

According to various embodiments of the present disclosure, the notification method may further include displaying a social reaction message inviting a reaction to the first contents. The social action message may be generated to include a selection item for uploading contents related to the first contents. The social reaction message may be generated to include a selection item for inputting a user's reaction to the first contents and a selection item for transmitting the input user's reaction to the at least one second user.

Figure 13:
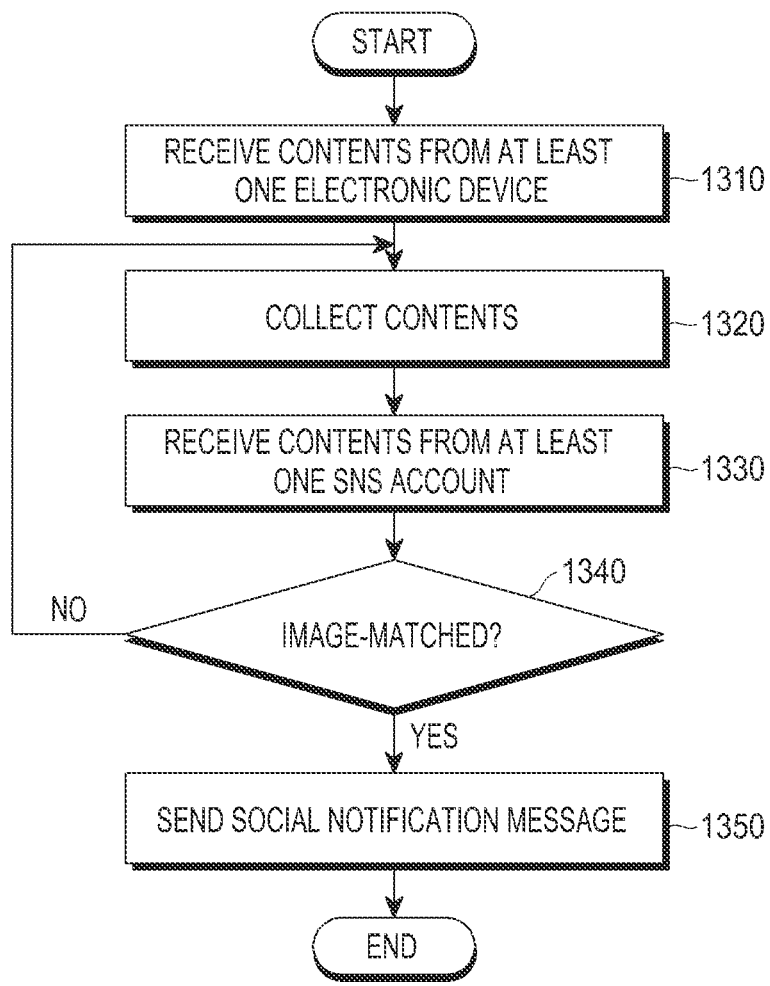
FIG. 13 is a flowchart illustrating an example of an operation flow of an image matching server according to an embodiment of the present disclosure.

FIG. 13 is a flowchart illustrating an example of an operation flow in an image matching server according to an embodiment of the present disclosure.

Referring to FIG. 13, in operation 1310, the image matching server 200 receives contents from at least one electronic device. According to an embodiment of the present disclosure, the image matching server 200 receives contents from at least one SNS account. In operation 1320, the image matching server 200 collects contents information from the received contents.

In operation 1330, the image matching server 200 receives newly uploaded contents from the at least one SNS account. According to an embodiment of the present disclosure, the image matching server 200 may receive the newly uploaded contents from at least one electronic device.

In operation 1340, the image matching server 200 determines whether previously collected contents are image-matched with the new contents.

If the contents are image-matched, the image matching server 200 sends, to the SNS account or electronic device that has transmitted the matched contents, a social notification message indicating the new contents are uploaded, in operation 1350. The image matching server 200 may also send the social notification message to the SNS server 400.

For example, a notification method of a server in an SNS service according to various embodiments of the present disclosure may include comparing previously received contents with first contents, if recognizing the first contents that are new contents from a first user, generating a notification message indicating that the first contents related with second contents are uploaded, if the second contents including at least a part of information of the first contents exist among information of the previously received contents, and sending the generated notification message to at least one user who uploads the first contents or the second contents.

According to various embodiments of the present disclosure, the notification method may further include sending the generated notification message to at least one second user, if the first contents are uploaded from the at least one second user who has a relationship with the first user on an SNS account.

The generated notification message may further include information regarding a relationship between the information of the first contents and information of the second contents. The information of the first contents or the information of the second contents may include at least one of location information, time information, capturing target information, exposure, whether to use a flash, a resolution, a size of contents, information of the first user, and information of the at least one second user.

The information regarding a relationship may be information indicating that the first contents are captured in a location that is similar to a location where the second contents are captured, if the information of the second contents includes location information corresponding to the first contents. The information regarding a relationship may be information indicating that the first contents are obtained by capturing a target that is similar to that of contents of the first user, if the information of the second contents includes capturing target information corresponding to the first contents.

The method and apparatus for generating a social notification message according to various embodiments of the present disclosure may be made as described above, and while detailed embodiments of the present disclosure have been described so far, various modifications may be made without departing the scope of the present disclosure.

For example, the electronic device according to the present disclosure is applied to a portable terminal in the foregoing description, but the present disclosure may also be applied to any electronic device capable of transmitting and receiving a notification from an SNS server such as a laptop computer, a tablet PC, or a general PC according to various embodiments of the present disclosure.

In the description of the embodiments of the present disclosure, image information of contents has been used to generate a social notification message, but the present disclosure may also be applied to generation of the social notification message using other information of contents.

As such, various embodiments may be possible based on various additional applications, modifications, and changes of the present disclosure, and thus the scope of the present disclosure should be defined by claims and equivalents thereof, rather than the described embodiments.

It may be seen that the embodiments of the present disclosure may be implemented with hardware, software, or a combination of hardware and software. Such arbitrary software may be stored, whether or not erasable or re-recordable, in a volatile or non-volatile storage such as a ROM; a memory such as a RAM, a memory chip, a device, or an integrated circuit; and an optically or magnetically recordable and machine (e.g., computer)-readable storage medium such as a Compact Disc (CD), a DVD, a magnetic disk, or a magnetic tape. A memory that may be included in a portable terminal may be an example of a machine-readable storage medium suitable for storing a program or programs including instructions for implementing various embodiments of the present disclosure. Therefore, the present disclosure includes a program including a code for implementing an apparatus or a method of an arbitrary claim of the present disclosure and a machine-readable storage medium having stored the program therein. The program may be electronically transmitted through an arbitrary medium such as a communication signal delivered through wired or wireless connection, and the present disclosure properly includes equivalents thereof.

As is apparent from the foregoing description, a notification method in an Internet service according to various embodiments of the present disclosure may provide a user with a notification regarding contents that may form a common interest with the user among a lot of uploaded contents.

In addition, according to various embodiments of the present disclosure, the user may be notified that contents newly uploaded by another user related with the user on an SNS account are uploaded, and also that the contents may form a common interest with the user. Another user may be, for example, a user's friend or a user-related enterprise. Thus, SNS activities between users may become active.

According to various embodiments of the present disclosure, reactions between users to contents that form a common interest may be invited through the social action message inviting the users' reactions to the contents.

Other effects that may be obtained or estimated from the embodiments of the present disclosure are explicitly or implicitly disclosed in the detailed description of the embodiments of the present disclosure. That is, various effects expected according to the embodiments of the present disclosure are disclosed in the detailed description of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A notification method of a server in an Internet service, the notification method comprising:
   in response to receiving a first image uploaded by a first user, identifying first geographical information from visual data of the first image;
   identifying a second image which includes second geographical information corresponding to the first geographical information from among images uploaded to a social network service (SNS) server, wherein the second image was uploaded by a terminal of a second user which has a relationship with the first user on the SNS server;
   identifying the second user that uploaded the second image to the SNS server; and
   transmitting a notification message to the terminal of the second user,
   wherein the notification message indicates that the first image including the first geographical information corresponding to the second geographical information was uploaded to the SNS server,
   wherein the second image is uploaded before the first image, and
   wherein the notification message includes at least one of time information, capturing target information, exposure, whether to use a flash, a resolution, a size of contents, information of the first user, or information of the second user.

2. The notification method of claim 1, further comprising, if the second image was captured by the second user and the second user has a relationship with the first user on the SNS server, sending the notification message to the second user.

3. The notification method of claim 1, wherein the notification message comprises third information regarding a relationship between the first geographical information and the second geographical information.

4. The notification method of claim 3, wherein the third information indicates a difference between a time the first image was captured and a time that the second image was captured.

5. The notification method of claim 3, wherein, if the second geographical information comprises target information corresponding to the first geographical information, the third information indicates a target of the first image and the second image.

6. A notification method of an electronic device in an Internet service, the notification method comprising:
- transmitting images to a server for uploading to a social network service (SNS) server, the images including visual data that comprises geographical information;
- in response to uploading a first image on the SNS server by a terminal of a first user, receiving, from the server, a notification message indicating that the first image which includes geographical information that corresponds to geographical information of a second image from among the images were uploaded to the SNS server; and
- in response to receiving the notification message, displaying the notification message,
- wherein the first user has a relationship with a second user of the electronic device on the SNS server,
- wherein the second image is an image uploaded before the first image is uploaded, and
- wherein the notification message includes at least one of time information, capturing target information, exposure, whether to use a flash, a resolution, a size of contents, information of the first user, or information of the second user.

7. The notification method of claim 6, further comprising displaying a social reaction message inviting a reaction to the first image.

8. The notification method of claim 7, wherein the social reaction message includes a selection item for uploading contents related to the first image.

9. The notification method of claim 7, wherein the social reaction message includes a selection item for inputting the reaction to the first image and a selection item for transmitting the reaction to the second user.

10. A server in an Internet service, the server comprising:
- a transceiver; and
- at least one processor configured to:
- in response to receiving a first image uploaded by a first user, identify first geographical information from visual data of the first image,
- identify a second image which includes second geographical information corresponding to the first geographical information from among images uploaded to a social network service (SNS) server, wherein the second image was received from a terminal of a second user which has a relationship with the first user on the SNS server,
- identify the second user that uploaded the second image to the SNS server, and
- control the transceiver to transmit a notification message to the terminal of the second user,
- wherein the notification message indicates at least one of that the first image including the first geographical information corresponding to the second geographical information was uploaded to the SNS server or that the second image including the second geographical information was uploaded to the SNS server,
- wherein the second image is an image uploaded before the first image is uploaded, and
- wherein the notification message includes at least one of time information, capturing target information, exposure, whether to use a flash, a resolution, a size of contents, information of the first user, or information of the second user.

11. The server of claim 10, wherein the at least one processor is further configured to, if the second image was captured by the second user and the second user has a relationship with the first user on the SNS server, control the transceiver to send the notification message to the second user.

12. The server of claim 10, wherein the notification message comprises third information regarding a relationship between the first geographical information and the second geographical information.

13. The server of claim 12, wherein the third information indicates a difference between a time the first image was captured and a time that the second image was captured.

14. The server of claim 12, wherein, if the second geographical information comprises target information corresponding to the first geographical information, the third information indicates a target of the first image and the second image.

15. The server of claim 14, wherein the third information includes textual information defining the first user's experience and the second user's experience.

16. An electronic device of an Internet service, the electronic device comprising:
- a transceiver;
- a display; and
- at least one processor configured to:
- control the transceiver to transmit images to a server for uploading to a social network service (SNS) server, the images including visual data that comprises geographical information,
- in response to uploading a first image to the SNS server by a terminal of a first user, receive a notification message, through the transceiver from the server, indicating that the first image which includes geographical information that corresponds to geographical information of a second image from among the images was uploaded to the server, and
- in response to receiving the notification message, control the display to display the notification message,
- wherein the first user has a relationship with a second user of the electronic device on the SNS server,
- wherein the second image is uploaded before the first image, and wherein the notification message includes at least one of time information, capturing target information, exposure, whether to use a flash, a resolution, a size of contents, information of the first user, or information of the second user.

17. The electronic device of claim 16, wherein the at least one processor is further configured to control the display to display a social reaction message inviting a reaction to the first image.

18. The electronic device of claim 17, wherein the social reaction message includes a selection item for uploading contents related to the first image.

19. The electronic device of claim 17, wherein the social reaction message includes a selection item for inputting the reaction to the first image and a selection item for transmitting the reaction to the second user.

* * * * *